(12) United States Patent  (10) Patent No.: US 7,145,279 B2
Bender  (45) Date of Patent: Dec. 5, 2006

(54) MOUNT PART FOR COMMUTATOR BRUSHES OF AN ELECTRIC MOTOR

(75) Inventor: Guenther Bender, Rodheim (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 11/062,788

(22) Filed: Feb. 23, 2005

(65) Prior Publication Data

US 2005/0140242 A1    Jun. 30, 2005

Related U.S. Application Data

(63) Continuation of application No. PCT/DE03/03726, filed on Nov. 11, 2003.

(30) Foreign Application Priority Data

Dec. 4, 2002    (DE)    ............................ 102 56 831

(51) Int. Cl.
  *H02K 13/00*  (2006.01)
  *H02K 5/14*   (2006.01)
  *H02K 5/22*   (2006.01)
(52) U.S. Cl. .................. 310/242; 310/244; 310/246; 310/247; 310/248
(58) Field of Classification Search ............... 310/239, 310/244, 246, 247, 242, 238, 248
See application file for complete search history.

(56) References Cited

U.S. PATENT DOCUMENTS

| 4,596,941 | A |   | 6/1986 | Kluck |
| 4,746,829 | A | * | 5/1988 | Strobl ................. 310/239 |
| 5,103,131 | A |   | 4/1992 | Sekine |
| 5,734,219 | A |   | 3/1998 | Horski et al. |
| 5,780,952 | A | * | 7/1998 | Lau ..................... 310/239 |

FOREIGN PATENT DOCUMENTS

| DE | GM7609317 |   | 7/1976 |
| DE | GM7609316 |   | 8/1976 |
| DE | GM7609316 | * | 12/1976 |
| DE | G8808999.1 |   | 4/1989 |
| DE | G9106141.5 |   | 10/1991 |
| DE | 10112427 A1 |   | 9/2002 |
| DE | 10063405 C2 |   | 1/2003 |
| GB | 1062700 |   | 3/1967 |
| GB | 2 214 358 |   | 8/1989 |

OTHER PUBLICATIONS

Derwent-Abstract-DE10112427A1; Sep. 19, 2002; Robert Bosch GmbH; D-70469 Stuttgart (Germany).
Derwent-Abstract-DE10063405C2; Jan. 23, 2003; K-TEC GmbH, D-61389 Schmitten (Germany).
Abstract-DE-G9106141.5; Oct. 31, 1991; Johnson Electric SA, CH-La Chaux-de-Fonds, Neuenburg (Switzerland).
Abstract-DE-G8808999.1; Apr. 6, 1989; Johnson Electric Indsutrial Mfg.Ltd, CN-Chaiwan, Hong Kong (China).
Abstract-DE-GM7609317; Jul. 22, 1976; VDO Adolf Schindling AG, D-6000 Frankfurt (Germany).
Abstract-DE-GM7609316; Aug. 12, 1976; VDO Adolf Schindling AG, D-6000 Frankfurt (Germany).

* cited by examiner

*Primary Examiner*—Tran Nguyen
(74) *Attorney, Agent, or Firm*—Siemens AG

(57) ABSTRACT

The invention relates to a support element on which the commutator brushes are each disposed on one curved spiral spring each. Said spring, on its side facing away from the commutator brush in the area of the end of the coil is trapezoid and is braced between an outer stop and an inner stop with its longest edge that corresponds to the longest side of the trapezoid.

7 Claims, 2 Drawing Sheets

MOUNT PART FOR COMMUTATOR BRUSHES OF AN ELECTRIC MOTOR

CROSS REFERENCE TO RELATED APPLICATIONS

The present application is a continuation of international application PCT/DE2003/003726, filed on 11 Nov. 2003, which designated the United States and was pending at the time of designation; and further claims priority to German patent application 10256831.6, filed Dec. 4, 2002; the both of which are herein incorporated by reference.

BACKGROUND OF THE INVENTION

The invention relates to a mount part for commutator brushes of an electric motor.

The arrangement of commutator brushes for an electric motor is known. DE 101 12 427 A1 has disclosed an electromotive adjusting unit for a metering system of an internal combustion engine. In this case, the brush holder is in the form of a so-called hammer-type brush holder which has two electrically conducting leaf springs which each bear a commutator brush and protrude freely and which are, with one of their ends, injection-molded on a mount plate and are connected to electrical conductors leading to plug contacts of the plug. The leaf springs comprise rectangular sheet-metal strips. In the case of a motor vehicle, a stationary, constant, mechanical contact between the collector and the commutator brushes is of critical importance. In the arrangement of the commutator brushes in accordance with the prior art, one disadvantage is the fact that when mechanical disturbances are introduced into the system, which may be brought about by, for example, oscillations from the outside, it is very easily possible for the commutator brushes to be lifted off from the commutator. This results in a current interruption with brush sparking, high carbon wear owing to erosion, induced voltage peaks being produced and the instability of electrical control circuits.

DE 76 09 316 has disclosed a mount part of the type described initially. With this mount part, the trapezoidal region is completely reinforced such that it cannot contribute to the build-up of a bearing force.

GB 1 062 700 describes a brush holder which is clamped between outer and inner stops in the form of journals, whereas U.S. Pat. No. 4,596,941 describes clamping by means of a piercing contact. This document also describes latching of the brush mount in an elevated position. U.S. Pat. No. 5,734,219 describes a brush system having three resiliently bearing brushes.

The invention is therefore based on the object of providing a mount part for commutator brushes with which the commutator brushes are largely prevented from being lifted off from the commutator even when relatively significant mechanical disturbances are introduced.

SUMMARY OF THE INVENTION

The object on which the invention is based is achieved by a mount part for commutator brushes of an electric motor, in which the trapezoidal form is clamped with its longest edge, which corresponds to the longest side of the trapezoid, between an outer stop and an inner stop and the imaginary edge K, which is remote from the clamping, of the trapezoid is aligned with the material reinforcement section.

The mount part is generally virtually circular and flat and has a central cutout for the collector and the commutator of the electric motor which is likewise circular. Depending on the temperature requirements, various spring materials are suitable for the torsion springs, in particular rust-free spring steels at higher temperatures. For example, in this case X10CrNi 18-8 can be used as the material. The torsion springs have, in each case at their end which is remote from the commutator brush, a trapezoidal form when developed. "When developed" is in this case to be understood to mean the torsion spring in the unloaded state, i.e. the sheet-metal strip per se. It has surprisingly been shown that the arrangement of the mount part on the electric motor means that the commutator brushes can largely be prevented from being lifted off from the commutator even in the event of relatively significant mechanical disturbances which take effect from outside. Owing to the trapezoidal form of each torsion spring at its end which is remote from the commutator brush, the load at the clamping point between the outer stop and the inner stop is reduced.

At the same time, the curvature of the torsion springs reduces or almost completely prevents the effect of torsion forces on the commutator brushes, with the result that the commutator brushes are always in direct, full contact with the commutator. In addition, the imaginary edge K, which is remote from the clamping, of the trapezoid is aligned with the material reinforcement section. This means that the imaginary edge K, which is remote from the clamping, of the trapezoid bears directly against the material reinforcement section. In this case it is advantageous that the region of the trapezoidal form of the respective torsion spring is completely available for absorbing torsion forces, which also has a positive effect on the contact-making between the commutator brushes and the commutator. Current interruption with brush sparking therefore does not come about.

One preferred refinement of the invention consists in the outer stop having a curvature which is at an angle with respect to the respective torsion spring. The angled curvature of the outer stop likewise counteracts an excess load on the torsion spring directly at the clamping point, since the torsion spring can unwind when relatively high torsion forces act in the direction of the outer stop almost at the outer stop. Plastic deformation of the torsion spring is thus advantageously prevented.

In accordance with a further preferred refinement of the invention, a plug sleeve is arranged as the inner stop. This may be, for example, a plug sleeve in accordance with DIN 46340. In this case it is advantageous that the torsion spring can have electrical power applied to it directly at its clamping point, it not being necessary to arrange any additional parts between the inner stop and the respective torsion spring.

A further preferred refinement of the invention provides for the torsion spring to have, in the region of the respective commutator brush, a material reinforcement section at its end which is remote from the commutator brush. This material reinforcement section may be in the form of a sheet-metal strip which is fixed at this end to the torsion spring. However, it is also possible to arrange the torsion spring itself with tabs which are bent back at an angle of almost 90° and thus form a rigid region having a U-shaped cross section. The material reinforcement section may thus also be part of the torsion spring. The mechanical robustness of the torsion spring is thus improved.

A further preferred refinement of the invention consists in, for at least one torsion spring, a latching section, which can be retracted perpendicular to the longitudinal direction of the mount part, being arranged at its end which is remote from the respective clamping. The latching section is generally a retractable pin which, when retracted, releases the torsion spring such that the respective commutator brush is pressed against the commutator. This advantageously simplifies assembly and disassembly, since the accessibility of the commutator is improved.

A further preferred refinement of the invention provides for three commutator brushes to be arranged individually on in each case one torsion spring. In total three commutator brushes and three torsion springs are thus arranged, one commutator brush being arranged on each torsion spring. This provides good operational reliability even in the case of relatively large electric motors.

BRIEF DESCRIPTION OF THE SEVERAL VIEWS OF THE DRAWINGS

The invention will be explained in more detail and by way of example below with reference to the drawing (FIG. 1 to FIGS. 3a), b)), in which.

DETAILED DESCRIPTION OF THE INVENTION

Figure 1:
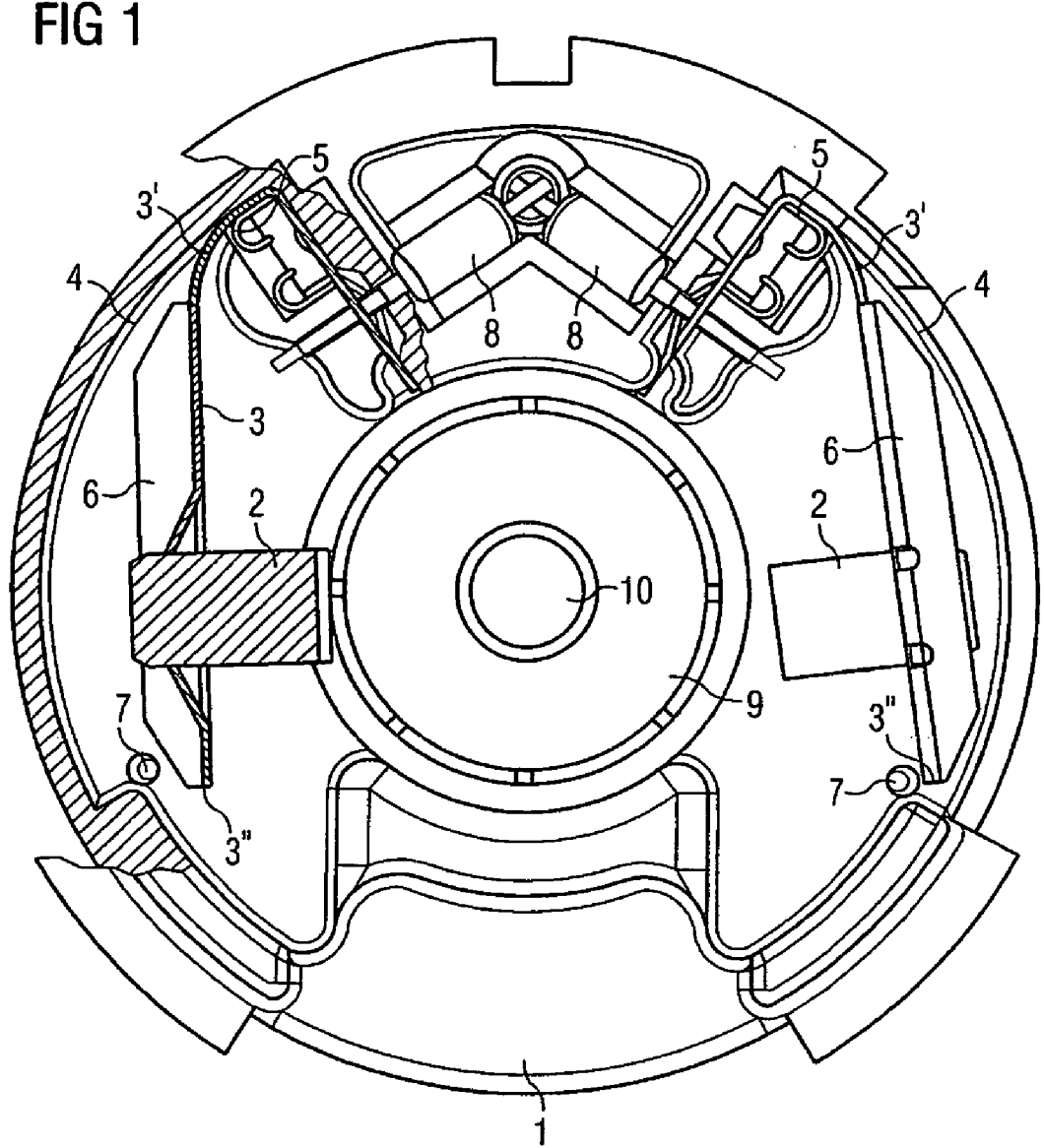
FIG. 1 shows the plan view of the mount part for commutator brushes, partially in longitudinal section.

FIG. 1 shows a simplified schematic illustration of the plan view, partially in longitudinal section (hatched), of the mount part 1 for commutator brushes 2 of the electric motor. The commutator brushes 2 are in this case arranged on in each case one curved torsion spring 3 which has, in each case at their end 3' which is remote from the commutator brush 2, a trapezoidal form (not illustrated) when developed. With its longest edge, which corresponds to the longest side of the trapezoid, each torsion spring 3 is clamped between an outer stop 4 and an inner stop 5. The outer stop 4 has a curvature which is at an angle with respect to the curved torsion spring 3. A plug sleeve is in each case arranged as the inner stop 5. This plug sleeve applies electrical power to the respective torsion spring 3. Each torsion spring 3 has, in the region of the respective commutator brush 2, a material reinforcement section 6 at its end which is remote from the commutator brush 2. This material reinforcement section 6 increases the mechanical robustness of the torsion spring 3. For each torsion spring 3, a latching section 7 which can be retracted perpendicular to the longitudinal direction of the mount part 1 is arranged at its respective end 3" which is remote from the respective clamping. The right-hand half of FIG. 1 shows the torsion spring 3 in this case in the latched state. The left-hand half of FIG. 1 shows the torsion spring 3 in the released state such that the commutator brush 2 bears directly against the commutator 9. The collector 10 of the electric motor is located directly in the center of the mount part 1 arranged on the electric motor. In order to prevent electrostatic charges, two load resistors 8 are also arranged in the mount part 1 in a particularly preferred refinement.

Figure 2:
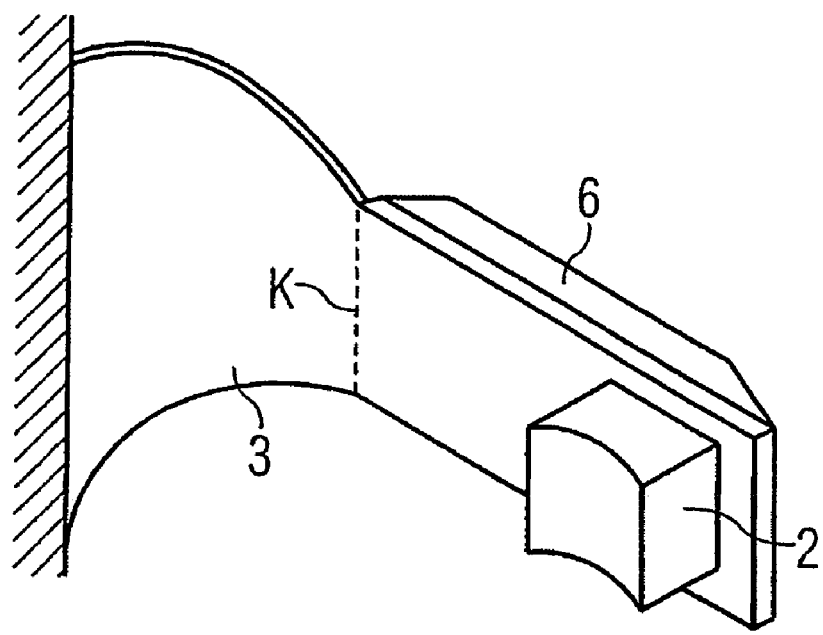
FIG. 2 shows the curved torsion spring in the clamped state.

FIG. 2 shows the torsion spring 3 in the clamped state. The imaginary edge K, which is remote from the clamping, of the trapezoid is aligned with the material reinforcement section 6. This ensures that the part of the torsion spring 3, which has a trapezoidal form when developed, is subjected to the entire bending load.

Figure 3A:
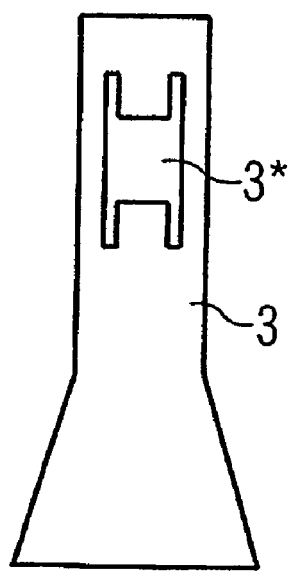
FIGS. 3a), b) show alternative refinements of a torsion spring in the form of the respective development.
Figure 3B:
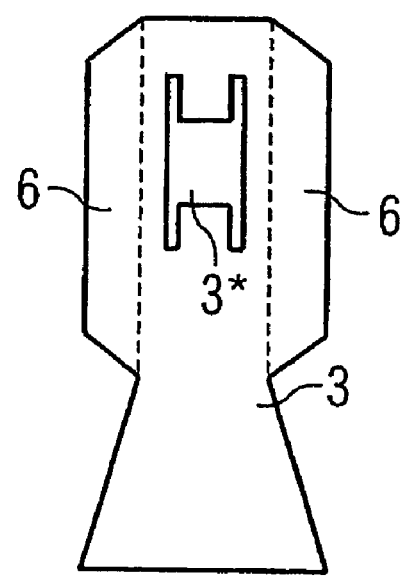

FIGS. 3a), b) show two forms of the torsion springs 3 when developed. As shown in FIG. 3a), the torsion spring 3 has only one cutout 3* for arranging the commutator brush (not shown). This form of the torsion spring 3 does not at the same time act as a material reinforcement section (not shown). In comparison thereto, a torsion spring 3 is shown in FIG. 3b) which has lateral tabs which are then in each case bent back along the dashed line, to be precise remote from the commutator brush (not shown), as is illustrated in FIG. 2. The bent-back tabs then act as the material reinforcement section 6. In this case it is advantageous that the torsion spring 3 and the material reinforcement section 6 comprise a single part.

The invention claimed is:

1. A mount part for commutator brushes of an electric motor, comprising:
   an outer stop;
   an inner stop; and
   a curved torsion spring on which a commutator brushes is arranged, the curved torsion spring comprising a curved section and a straight section coupled to the curved section and comprising the commutator brush,
   wherein the curved section is formed as a trapezoid that is clamped with a longest edge, corresponding to a longest side of the trapezoid, between the outer stop and the inner stop, the trapezoid further comprising an edge K located remote from the longest edge and aligned with the straight section, and
   wherein the straight section comprises a material reinforcement section having lateral tabs, so that a region of the trapezoid of the torsion spring is completely available for accommodating bending forces.

2. The mount part according to claim 1, wherein the outer stop has a curvature which is at an angle with respect to the respective torsion spring.

3. The mount part according to claim 1, further comprising a plug sleeve arranged as the inner stop.

4. The mount part according to claim 1, wherein, for at least one torsion spring , a latching section which can be retracted perpendicular to a longitudinal direction of the mount part, is arranged at a spring end which is remote from the clamping.

5. The mount part according to claim 1, further comprising three commutator brushes each arranged on an individual torsion spring.

6. The mount part according to claim 2, further comprising a plug sleeve arranged as the inner stop.

7. A mount part for commutator brushes of an electric motor, comprising:
   an outer stop;
   an inner stop; and
   a curved torsion spring on which a commutator brush is arranged, the curved torsion spring comprising a curved section and a material reinforcement section coupled to the curved section and comprising the commutator brush,
   wherein the curved section is formed as a trapezoid that is clamped with a longest edge, corresponding to a longest side of the trapezoid, between the outer stop and the inner stop, the trapezoid further comprising an edge K located remote from the longest edge and aligned with the material reinforcement section, and
   wherein the material reinforcement section provides that a region of the trapezoid of the torsion spring is completely available for accommodating bending forces.

* * * * *